United States Patent [19]
Sasaki et al.

[11] Patent Number: 5,570,379
[45] Date of Patent: Oct. 29, 1996

[54] CODED MODULATION APPARATUS

[75] Inventors: Eisaku Sasaki; Yuka Kuroda, both of Tokyo, Japan

[73] Assignee: NEC Corporation, Tokyo, Japan

[21] Appl. No.: 310,074

[22] Filed: Sep. 22, 1994

[30] Foreign Application Priority Data

Sep. 28, 1993 [JP] Japan ..................... 5-240969

[51] Int. Cl.$^6$ .......................... H03M 13/00; H04L 27/20
[52] U.S. Cl. .......................... 371/42; 371/376; 375/280; 375/281
[58] Field of Search .................... 371/37.6, 42, 46, 371/37.1, 49.3; 370/105.1; 375/269, 280, 281

[56] References Cited

U.S. PATENT DOCUMENTS

| | | | |
|---|---|---|---|
| 4,346,474 | 8/1982 | Sze | 371/49 |
| 4,807,230 | 2/1989 | Srinivasagopalan | 371/46 |
| 5,124,979 | 6/1992 | Matui | 370/76 |
| 5,448,592 | 7/1995 | Williams et al. | 375/263 |

FOREIGN PATENT DOCUMENTS 6216958  8/1994  Japan.

OTHER PUBLICATIONS

David R. Smith, "Digital Transmission Systems", 1985, published by Van Nostrand Reinhold Company, Inc., eight pages total.

*Primary Examiner*—Stephen M. Baker
*Attorney, Agent, or Firm*—Sughrue, Mion, Zinn, Macpeak & Seas

[57] ABSTRACT

A transmitting section performs error-correcting coding of signal streams, converts the signal streams into a $2^m$-value quadrature amplitude-modulated radio signal, and transmits the radio signal to a channel. A receiving section receives the radio signal and generates signal streams having the same signal format as that of the above signal streams. An encoder codes a signal stream according to even and odd parity rules respectively set for the first and second half portions of a frame pulse. A decoder decodes a signal stream on the assumption that different parity rules are applied for the first and second half periods of the signal stream, and at the same time reproduces a frame pulse. This coded modulation scheme can eliminate uncertainty in the arrangement of signal streams in a rate converter.

7 Claims, 9 Drawing Sheets

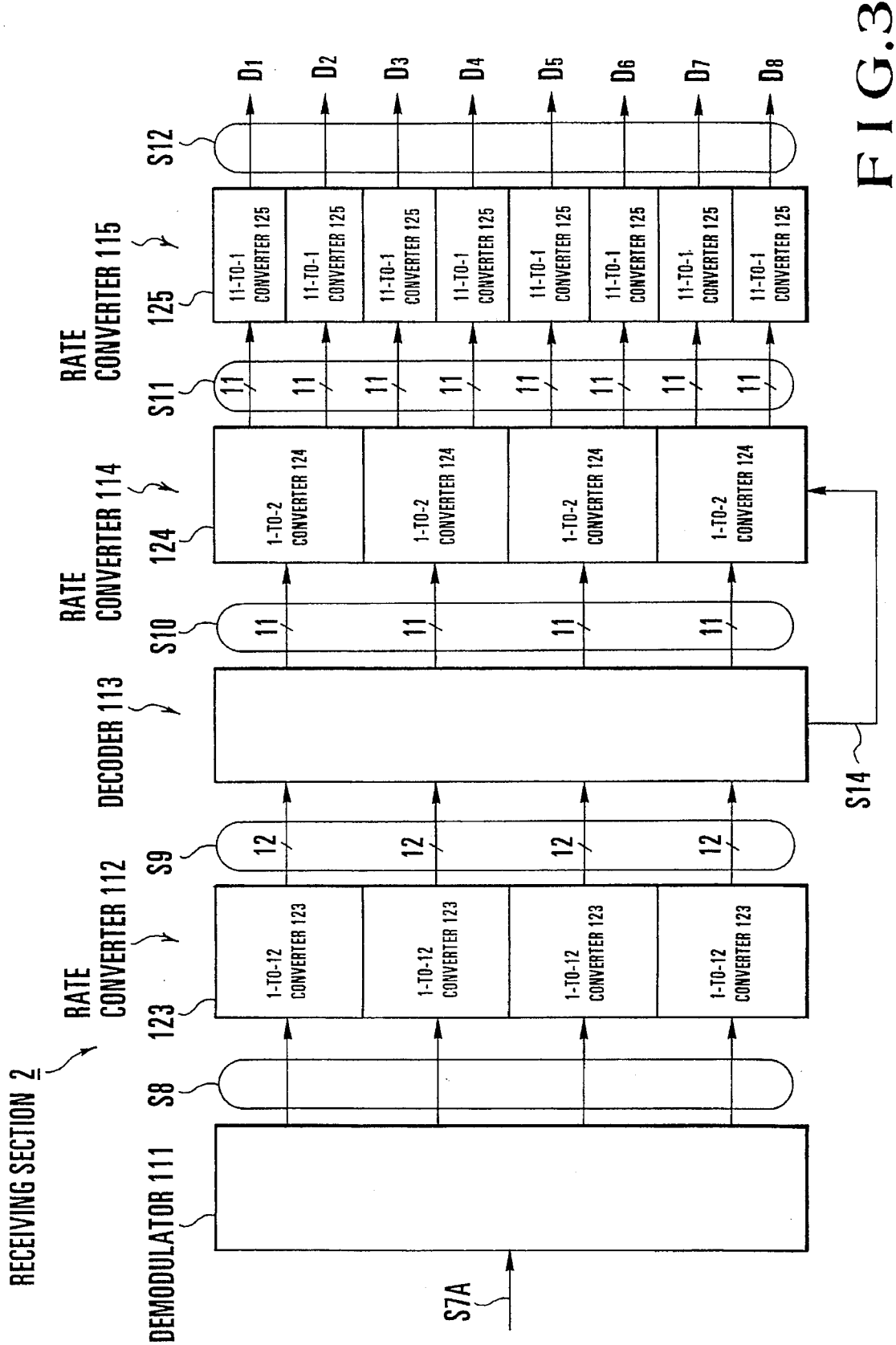

FIG.4A SIGNAL STREAMS S1
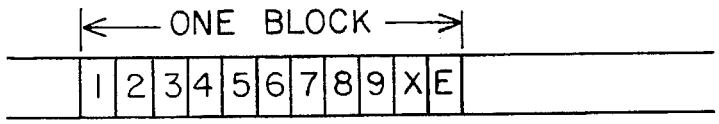
FIG.4B
FIG.4C SIGNAL STREAMS S2
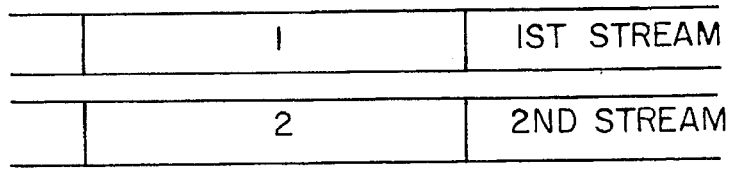
FIG.4D
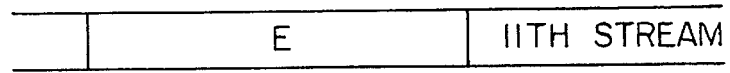
FIG.4E SIGNAL STREAMS S3
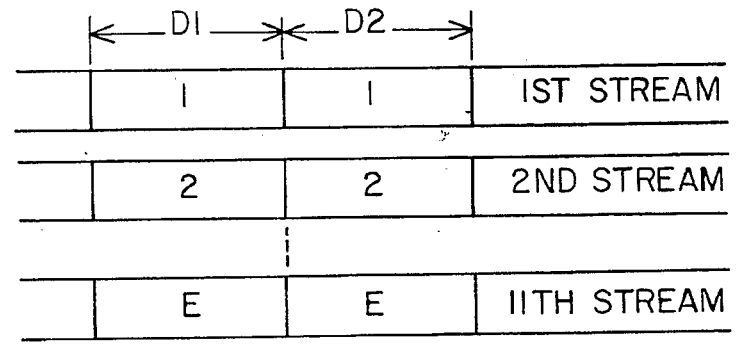
FIG.4F FRAME PULSE S13

REDUNDANCY CODE STREAMS

| | | | |
|---|---|---|---|
| | I | I | 1ST STREAM |
| | 2 | 2 | 2ND STREAM |
| | ⋮ | ⋮ | |
| | E | E | 11TH STREAM |
| | EVEN PARITY | ODD PARITY | 12TH STREAM |

SIGNAL STREAMS S9

| | | | |
|---|---|---|---|
| | I | I | 1ST STREAM |
| | 2 | 2 | 2ND STREAM |
| | ⋮ | ⋮ | |
| | E | E | 11TH STREAM |
| | EVEN | ODD | 12TH STREAM |

FRAME PULSE S14

DECODED SIGNAL STREAMS S10

| | D1 | D2 | |
|---|---|---|---|
| | I | I | 1ST STREAM |
| | 2 | 2 | 2ND STREAM |
| | ⋮ | ⋮ | |
| | E | E | 11TH STREAM |

FIG.4K
SIGNAL STREAMS S11

| "I" OF D1 | 1ST STREAM |
|---|---|
| ⋮ | |

FIG.4L

| "E" OF D2 | 22ND STREAM |
|---|---|

FIG.4M
SIGNAL STREAMS S5

|←1 BLOCK→| | |
|---|---|---|
| D1 | D2 | 1ST STREAM |
| D3 | D4 | 2ND STREAM |
| D5 | D6 | 3RD STREAM |
| D7 | D8 | 4TH STREAM |

FIG.4N
SIGNAL STREAMS S8

|←1 BLOCK→| | |
|---|---|---|
| D1 | D2 | 1ST STREAM |
| D3 | D4 | 2ND STREAM |
| D5 | D6 | 3RD STREAM |
| D7 | D8 | 4TH STREAM |

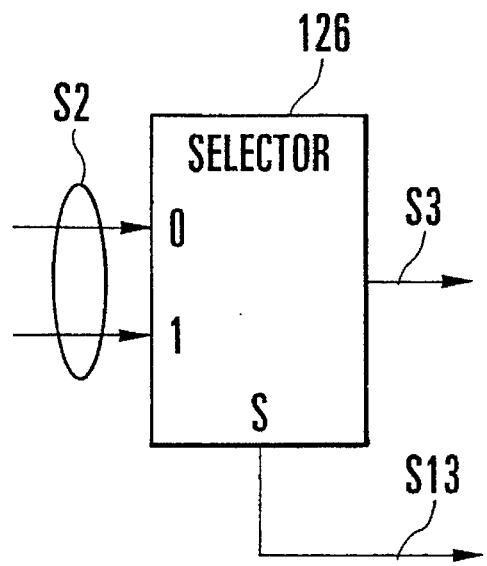
F I G. 5
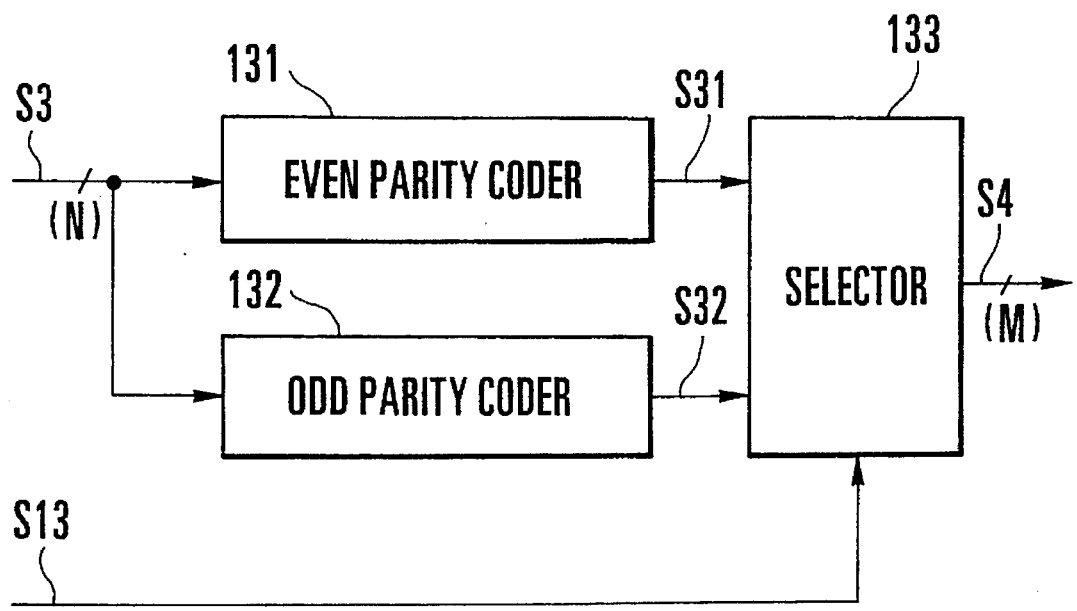
F I G. 6

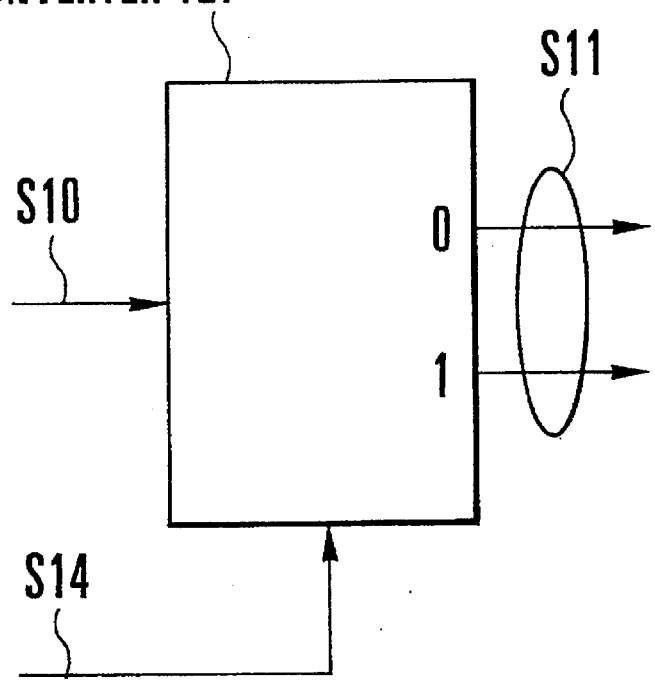
F I G. 8

CODED MODULATION APPARATUS

BACKGROUND OF THE INVENTION

The present invention relates to a coded modulation scheme and, more particularly, to an improvement in coding rate conversion in a coded modulation scheme designed to compensate for redundancy by band expansion.

Recently, in digital microwave communication schemes, forward error correction schemes with higher error-correcting abilities have been introduced to improve transmission characteristics. One of such schemes is a coded modulation scheme. The coded modulation scheme incorporates an error-correcting technique and a modulation/demodulation technique. This scheme is superior to a conventional error-correcting scheme, which is independent of a modulation/demodulation technique. Note that in the conventional error-correcting scheme, redundancy bits are added to the respective signal streams in the same ratio, and rate conversion is performed for each stream.

Similar to the conventional error-correcting scheme, this coded modulation scheme adds redundancy signals to information signals (which are to be transmitted) so as to have an error-correcting ability. The scheme is different from the conventional scheme in that redundancy is compensated by an increase in the number of signal points instead of by band expansion. If, however, band expansion is allowed to a certain extent, the addition of redundancy by means of band expansion is advantageous in terms of information transmission efficiency. In this case, rate converters for performing rate conversion for each frame must be arranged in both transmitting and receiving sections.

In the coded modulation scheme, since processing for coding varies for each signal stream, rate conversion must be performed collectively in minimum units of signals input to an encoder. In an SDH (Synchronous Digital Hierarchy) transmission system, since signal processing must be performed for each byte, the number of signal streams input to an encoder is preferably eight. If, however, the number of input signal streams is limited to eight, it may be difficult to realize a rate converter depending on a coding rate R. If the coding rate R is given by R=N/M (N and M are natural numbers, and M is larger than N), and N is a multiple of eight, each input signal stream may be serial/parallel-converted at a one-to-one ratio (N/8), and a redundancy signal may be added to the resultant signal. If, however, N is not a multiple of eight but is a multiple of four, rate conversion in coding must be performed collectively with respect to signals of two minimum units. That is, one block is constituted by two minimum units. In rate conversion on the reception side, parallel/serial conversion is required. If the delimiters of blocks are not defined, the problem of uncertainty is posed in the arrangement of signals in parallel/serial conversion. No information about the delimiters of blocks is obtained from a decoder. In general, therefore, in order to detect the delimiters of blocks, frame information other than an information signal and a redundancy signal obtained by error-correcting coding, i.e., a frame pulse for frame synchronization, is inserted between blocks in a transmitting section, and the frame pulse is detected in a receiving section ("Digital Transmission System", pp. 131–141, 1985).

In the conventional coded modulation scheme described above, however, in order to eliminate the uncertainty of a rate conversion unit in the receiving section, phase information, i.e., a frame pulse, must be added to information signal bits. For this reason, in the transmitting section, the information signal transmission efficiency deteriorates in accordance with the insertion of the frame pulse. Furthermore, the receiving section requires a frame synchronization circuit as an extra component.

SUMMARY OF THE INVENTION

It is an object of the present invention to provide a coded modulation apparatus which adds no frame pulse to a radio signal.

It is another object of the present invention to provide a coded modulation apparatus which improves the information signal transmission efficiency.

It is still another object of the present invention to provide a coded modulation apparatus which realizes simplification of a receiving unit.

In order to achieve the above objects, according to the present invention, there is provided a coded modulation apparatus comprising a transmitting unit for performing error-correcting coding of eight first signal streams at a coding rate R=N/M (where N and M are natural numbers, and M is not less than N), converting the first signal streams into a $2^m$-value quadrature amplitude-modulated radio signal (m is a natural number not less than four, and M is a multiple of m), and transmitting the radio signal to a channel, a receiving unit for receiving the radio signal from the transmitting unit via the channel and converting the radio signal into second signal streams each having the same signal format as that of each of the first signal streams, the transmitting unit including first rate conversion means for serial/parallel-converting the first signal streams in units of N/4 bits at a one-to-N/4 ratio to generate 2N third signal streams, second rate conversion means for parallel/serial-converting the third signal streams from the first rate conversion means at a two-to-one ratio to generate N fourth signal streams, and generating a first frame pulse for setting a frame width equal to an N/4-bit width of the first signal stream, coding means for adding a predetermined redundancy code to each of the fourth signal streams from the second rate conversion means, and generating M redundancy code streams by performing error-correcting coding of the fourth signal streams from the second rate conversion means according to different coding rules respectively set for first and second half portions of a frame on the basis of the first frame pulse from the second rate conversion means, third rate conversion means for parallel/serial-converting the redundancy code streams from the coding means at a one-to-M/m ratio to generate m modulated signal streams, mapping means for converting the modulated signal streams from the third rate conversion means into m mapping signal streams representing coordinates of signal points corresponding to m-bit signals of the modulated signal streams, and modulation means for generating a radio signal to be transmitted to the channel by performing $2^m$-value quadrature amplitude modulation in response to the mapping signals from the mapping means, and the receiving unit including demodulation means for generating m demodulated signal streams by demodulating the radio signal from the channel, fourth rate conversion means for converting the demodulated signal streams from the demodulation means at a one-to-M/m ratio to generate M fifth signal streams, decoding means for generating a second frame pulse on the basis of the fifth signal streams from the fourth rate conversion means, and generating N decoded signal streams by performing error correction of the fifth signal streams from the fourth rate conversion means according to different coding rules respectively set for first and second half portions of a frame on the basis of the second frame pulse and eliminating the redundancy code added by the coding means, fifth rate conversion means for parallel/serial-converting the decoded signal streams from the decoding means at a two-to-one ratio on the basis of the second frame pulse from the decoding means to generate 2N sixth signal streams, and sixth rate conversion means for parallel/serial-converting the sixth signal streams from the fifth rate conversion means at a ratio of N/4-to-one to generate the second signal streams.

BRIEF DESCRIPTION OF THE DRAWINGS

FIG. 3 is a block diagram showing an example of a receiving section in FIG. 1 when the coded modulation apparatus is a 16 QAM apparatus;

FIG. 5 is a block diagram showing an example of a 2-to-1 converter constituting a rate converter 102 in FIG. 2;

FIG. 6 is a block diagram showing an example of an encoder 103 in FIG. 2;

FIG. 8 is a block diagram showing an example of 1-to-2 converter constituting a rate converter 114 in FIG. 3.

DESCRIPTION OF THE PREFERRED EMBODIMENT

The present invention will be described below with reference to the accompanying drawings.

Figure 1:
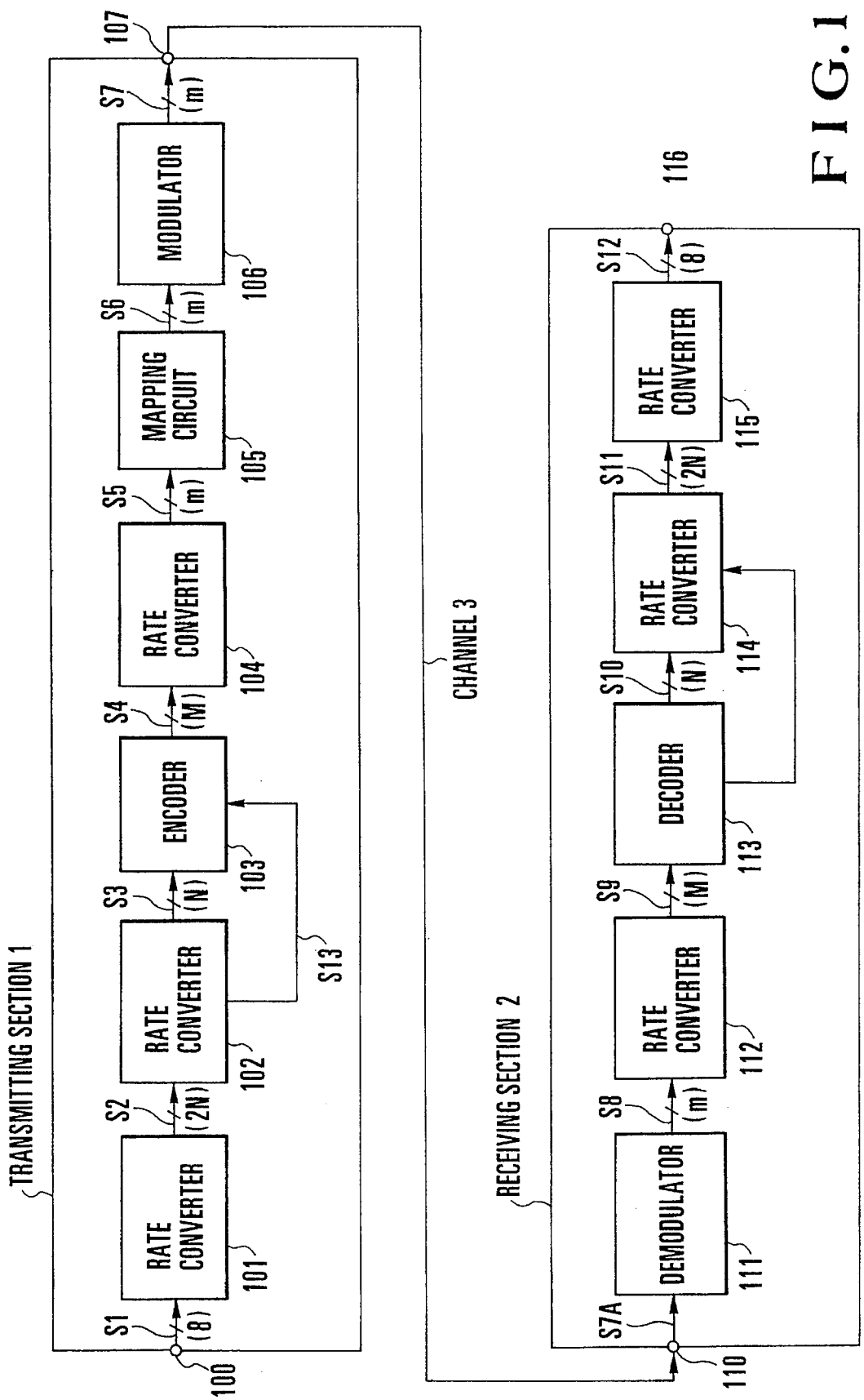
FIG. 1 is a block diagram showing a coded modulation apparatus according to an embodiment of the present invention.

FIG. 1 shows the arrangement of an embodiment of the present invention.

In a coded modulation radio apparatus of this embodiment, a transmitting section 1 performs error-correcting coding of eight signal streams S1, received at a signal input terminal 100, at a coding rate R=N/M, converts the signal streams into a $2^m$-value quadrature amplitude-modulated radio signal S7 (m is a natural number equal to or larger than four, and M is a multiple of m), and transmits the signals from a transmission terminal 107 to a channel 3. A receiving section 2 receives, at a reception terminal 110, a radio signal S7A having the same signal format as that of the signal transmitted from the transmitting section 1 via the channel 3, converts the radio signal S7A into signal streams S12 each having the same signal format as that of the signal streams S1, and outputs the signal streams to a signal output terminal 116.

A rate converter 101 of the transmitting section 1 performs serial/parallel conversion of the signal streams S1 in units of N/4 bits (i.e., blocks) at a ratio to generate 2N signal streams S2. Each stream of the signal streams S2 is parallel/serial-converted by a rate converter 102 at a two-to-one ratio. As a result, the signal streams S2 are converted into N signal streams S3. The rate converter 102 also generates a frame pulse S13 for setting an N/4-bit width of the signal stream S1 to be the width of a frame (frame width).

Each signal stream S3 and the frame pulse S13 are supplied to an encoder 103. The encoder 103 adds a predetermined redundancy code to the signal stream S3, and performs error-correcting coding of the signal stream S3 in synchronism with the frame pulse S13 according to different coding rules, e.g., even and odd parity rules, respectively set for the first block, in the first half of the frame, and the second block, in the second half of the frame, thereby generating M redundancy code streams S4. Since this redundancy code stream S4 employs different parity rules for the first and second blocks of the frame, a signal for determining the frame is substituted by parity rules and equivalently transmitted. The redundancy code streams S4 are parallel/serial-converted, at a M/m-to-one ratio, into m modulated signal streams S5 by a rate converter 104. The modulated signal streams S5 are converted into m mapping signals S6 representing the coordinates of signal points corresponding to the m-bit signals by a mapping circuit 105. The mapping signals S6 are $2^m$-value quadrature amplitude-modulated into radio signals S7 by a modulator 106.

A demodulator 111 of the receiving section 2 demodulates the radio signal S7A to generate m demodulated signal streams S8. The demodulated signal streams S8 are converted, at a one-to-M/m ratio, into M signal streams S9 by a rate converter 112. The signal streams S9 are supplied to a decoder 113.

The decoder 113 performs code synchronization with respect to each signal stream S9 according to the frame width of the frame pulse S13 to generate a frame pulse S14 having the same frame width as that of the frame pulse S13. This frame pulse S14 is generated by decoding the signal stream S9 upon changing, e.g., parity rules. In addition, the decoder 113 performs error correction of each signal stream S9 according to the different coding rules set for the first and second half-frame and eliminates the redundancy codes added by the encoder 103, thereby generating N coded signal streams S10. Each coded signal stream S10 and the frame pulse S14 are supplied to a rate converter 114. The rate converter 114 serial/parallel-converts the coded signal streams S10 at a two-to-one ratio with reference to the frame pulse S14 to generate 2N signal streams S11. As described above, since the rate converter 114 can use the frame pulse S14 generated by the decoder 113, the signal streams S11 from which the uncertainty of multiplexing order is eliminated can be generated. The signal streams S11 are parallel/serial-converted, at a N/4-to-one ratio, into the eight signal streams S12 by a rate converter 115.

An example of rate conversion in this embodiment will be described in detail next.

Figure 2:
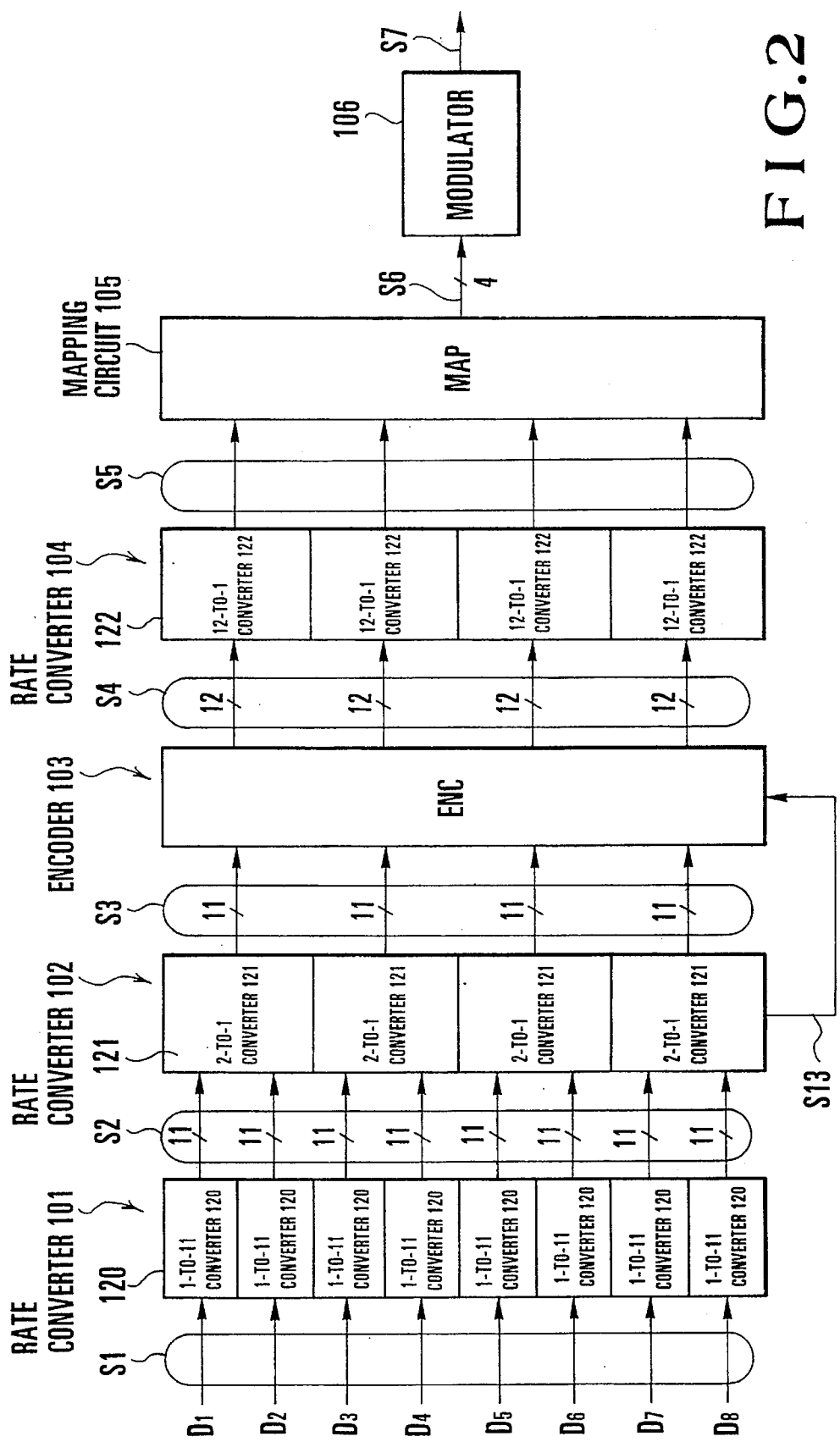
FIG. 2 is a block diagram showing an example of a transmitting section in FIG. 1 when the coded modulation apparatus is a 16 QAM (Quadrature Amplitude Modulation) apparatus.

FIG. 2 shows the arrangement of the transmitting section 1 when the coded modulation ratio apparatus of this embodiment is of a 16 QAM scheme. FIG. 3 shows an example of the arrangement of the receiving section 2 corresponding to this transmitting section 1. FIGS. 4A to 4M are timing charts of main signals in these examples.

Referring to FIGS. 2, 3, and 4A to 4M, this coded modulation radio apparatus is an apparatus of a coded modulation scheme using values defined as N=44, M=48, and m=4. That is, in the apparatus, the coding rate R=44/48, and $2^m$=16 QAM is performed.

Signal streams S1 (FIG. 4A) input to the transmitting section 1 are eight digital signal streams consisting of data streams D1 to D8. Since N=44 is not a multiple of eight, the rate converter 101 causes eight 1-to-11 converters 120 to serial/parallel-convert the data streams D1 to D8 in units of N/4=11 bits (bit 1 to bit E, consisting a block) of the signal stream S1 to generate 2N=88 (11 streams for the data stream D1) signal streams S2 (FIGS. 4B to 4D). The width of N/4 bits from stream S1 is defined as a frame width of a frame pulse S13 (and S14). Subsequently, the rate converter 102 causes four 2-to-1 converters 121 to parallel/serial-convert the 88 signal streams S2 in units of 11 streams (for each data stream) so as to generate N=44 signal streams S3 (FIG. 4F). The rate converter 102 also generates the frame pulse S13 (FIG. 4F) having a one-block width corresponding to a one-bit period of the signal stream S2. That is, a block from each of two streams of the data streams D1 to D8 is inserted within a one-frame width. FIG. 4E shows streams S3, with data from D1 (of streams S2) inserted in the first half of the frame, and with data from D2 (of streams S2) inserted in the second half of the frame. Each signal stream S3 and the frame pulse S13 are supplied to the encoder 103.

Figures 4G, 4H, 4I, 4J:
FIGS. 4A to 4N are timing charts of main signals required to explain the operations of the arrangements shown in FIGS. 2 and 3.

The encoder 103 performs error-correcting coding by adding a one-bit redundancy signal as a parity check code and three bits as another error correction code (e.g., a convolutional code) to each signal stream S3, thereby generating M/4=12 redundancy code streams S4 (FIG. 4G). In this case, the encoder 103 performs coding according to the even parity rule within the one-block width of the first half portion of the frame, and performs coding according to the odd parity rule within the one-block width of the second half portion of the frame. Assume that in this coding operation, other coding techniques are not changed.

The M=48 redundancy code streams S4 are rate-converted at a 12-to-1 ratio by four 12-to-1 converters 122 of the rate converter 104 to become m=4 signal streams S5 (see FIG. 4M). The modulated signal streams S5 are converted into four mapping signal streams S6 representing the coordinates of signal points corresponding to the m=4-bit signals. Thereafter, the signal streams are $2^m$=16 quadrature amplitude-modulated into a radio signal S7.

The radio signal S7A input to the receiving section 2 is demodulated into the m=4 demodulated signal streams S8 (see FIG. 4N) by the demodulator 111. Each stream of the signal streams S8 is a soft decision signal expressed by a plurality of bits. The modulated signal streams S8 are serial/parallel-converted into the M=48 signal streams S9 (FIG. 4H) by four 1-to-12 converters 123 of the rate converter 112, and the signal streams S9 are supplied to the decoder 113.

The decoder 113 decodes the signal streams S9 on the assumption that the encoder 103 alternately codes signal streams S3 according to the even and odd parity rules.

The reason why the above assumption is valid will be described below. Assume that in the decoder 113, a signal coded with an even parity is decoded with an odd parity, and a signal coded with an odd parity is decoded with an even parity. In this case, the decoder 113 always detects a parity error unless no signal error occurs in the channel 3. If a signal error has occurred in the channel 3, the decoder 113 detects no error portion corresponding to the signal error. However, since the signal error in the channel 3 is about 0.1 at most, the decoder 113 detects a parity error at a probability very close to 1. Assume that the order of the parity rule in the transmitting section 1 coincides with that in the receiving section 2. In this case, even if a signal error is caused in the channel 3, the parity error detection probability never becomes 0.1 or more. Therefore, a parity rule switching position in the encoder 103 can be detected by observing the parity error detection probability in the decoder 113.

The decoder 113 performs error correction of the signal streams S9 according to the parity rule detected in the above manner, and eliminates the four-bit redundancy signal added by the encoder 103, thereby outputting the 44 decoded signal streams S10 (FIG. 4J). Since the signal streams S10 which have undergone error correction need not be soft decision signals, a unit of rate conversion may be one bit for each stream. In addition, the decoder 113 generates the frame pulse S14 (FIG. 4I) having a one-block width with reference to the above parity rule switching position, and supplies the signal streams S10 and the frame pulse S14 to the rate converter 114.

The rate converter 114 causes four 1-to-2 converters 124 to serial/parallel-convert the signal streams S10 with reference to the frame pulse S14 to generate the 88 signal streams S11 (FIGS. 4K to 4L). The signal streams S11 have the same signal arrangement as that of the signal streams S2 in the transmitting section 1. Finally, the signal streams S11 are parallel/serial-converted, at a 11-to-1 ratio, into the eight signal streams S12 by 11 converters 125 of the rate converter 115. Each signal stream S12 has the same signal format of each signal stream S1 supplied to the transmitting section 1.

The apparatus described with reference to FIGS. 2 and 3 is the 16 QAM coded modulation apparatus with the coding rate R=N/M=44/48. If a numerator N of the coding rate R is not a multiple of eight but is a multiple of four, the embodiment shown in FIG. 1 can be applied to a modulation scheme of a multivalue larger than the hexadecimal value.

The main constituent elements of this embodiment will be described in detail next.

FIG. 5 shows an example of the 2-to-1 converter 121 incorporated in the rate converter 102 used in this embodiment.

Referring to FIGS. 2, 4A to 4L, and 5, the 2-to-1 converter 121 is constituted by a selector 126 for selecting one of the signal streams S2 respectively supplied from the two 1-to-11 converters 120 to two input terminals, input 0 and input 1. The selector 126 selects 11 bits corresponding to an odd stream of data streams D supplied to input 0 in the first half of a frame, and selects 11 bits corresponding to an even stream of data streams supplied to input 1 in the second half of the frame. The selector 126 outputs the frame pulse S13.

FIG. 6 shows an example of the encoder 103 used in this embodiment.

Referring to FIGS. 2, 4, and 6, an even parity coder 131 of the encoder 103 generates M redundancy code signals S31 by coding the signal streams S3 according to the even parity rule in response to the signal streams S3 and a predetermined error-correcting code. An odd parity coder 132 generates M redundancy code streams S32 by coding the signal streams S3 according to the odd parity rule in response to the signal streams S3 and the above error-correcting code. The signal streams S2 are processed in units of two blocks. Each of the redundancy code streams S31 and S32 includes a one-bit parity code and an error-correcting code such as a three-bit convolutional code for each block. The even parity coder 131 and the odd parity coder 132 employ the same coding method except for the parity rules.

A selector 133 alternately switches the redundancy code streams S31 and S32 in synchronism with the frame pulse S13 to output the redundancy code streams S4. That is, each redundancy code stream S4 is a signal stream based on two different coding rules, i.e., the even parity rule for the first half of a frame and the odd parity rule for the second half of the frame, and having the same ability of error correction as that of a coded stream. Furthermore, the frame pulse S13 is substituted by a change in parity rule for each block and equivalently transmitted. Note that the number of bits of each redundancy code stream S4 per two-block width is represented by N/4=11.

Figure 7:
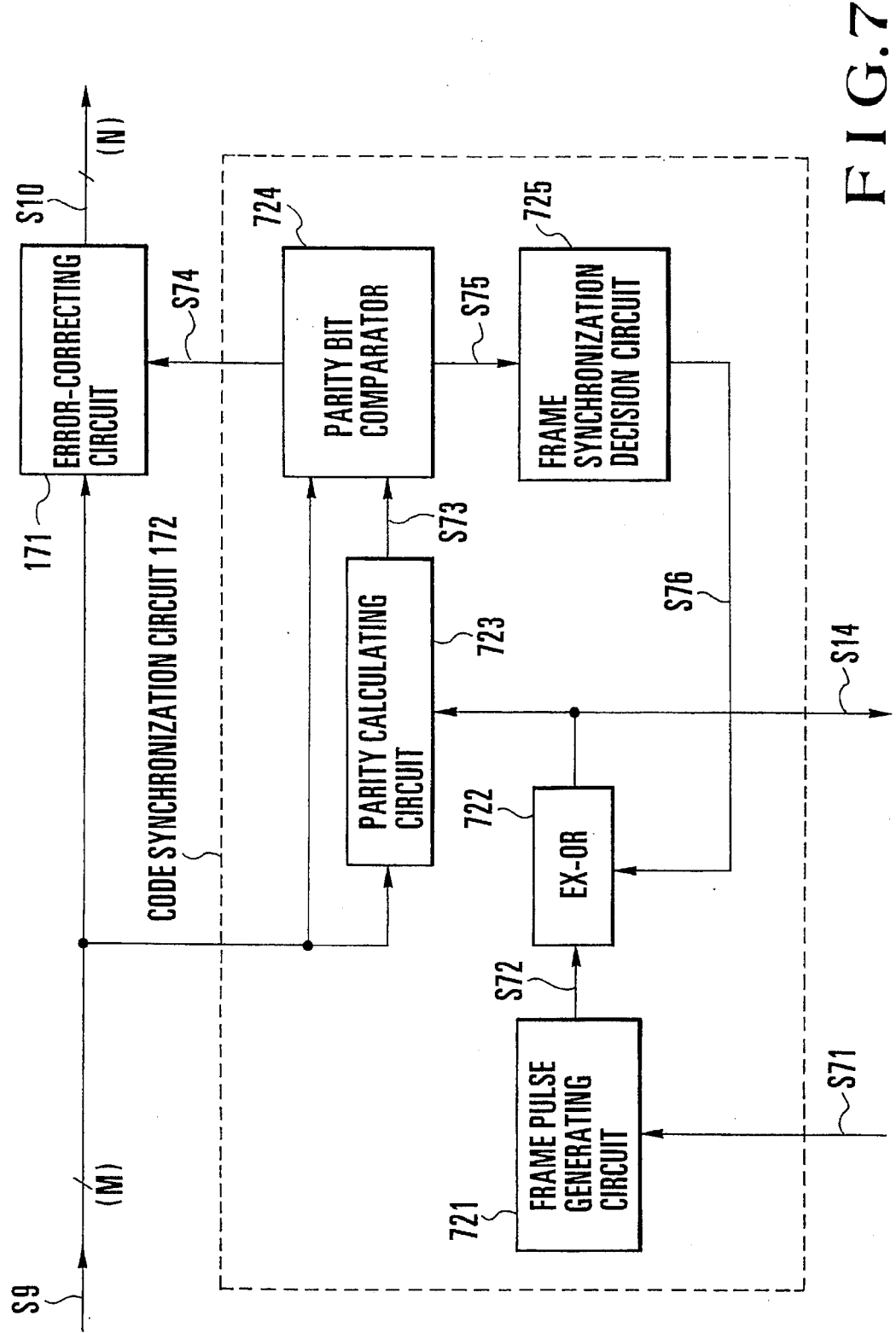
FIG. 7 is a block diagram showing an example of a decoder 113 in FIG. 3.

FIG. 7 shows an example of the decoder 113 used in this embodiment.

Referring to FIGS. 2, 4A to 4N, and 7, a frame pulse generating circuit 721 of the decoder 113 generates a frame pulse S72 having a two-block width in response to an apparatus clock S71 prepared by the transmitting section 1. An EX (exclusive)-OR gate 722 receives the frame pulse S72 from the frame pulse generating circuit 721, and outputs the frame pulse S14 having a two-block width on the basis of a frame asynchronization signal S76. A parity calculating circuit 723 calculates a parity for each signal stream S9 by switching the parity rules for each block width with reference to the frame pulse S14 having a two-block width, thereby forming a parity bit S73. A parity bit comparator 724 compares the parity bit of each signal stream S9 with the parity bit S73 from the parity calculating circuit 723, and generates a parity comparison result signal S74 representing the parity comparison result, and also generates an error pulse S75 if the two parity bits do not coincide with each other. A frame synchronization decision circuit 725 observes the frequency of occurrence of the error pulse S75. If this frequency of occurrence exceeds a predetermined threshold value, the frame synchronization decision circuit 725 determines that the state of frame synchronization in a parity calculation is a frame-asynchronized state, and generates a frame asynchronization signal S76. This determination on synchronization is based on the parity error detecting effect described above with reference to FIG. 3.

When the frame synchronization decision circuit 725 determines that the parity calculating circuit 723 is in a frame-asynchronized state, and generates the frame asynchronization signal S76, the EX-OR gate 722 receives the signal S76, and calculates the exclusive OR of the frame pulse S72 and the signal S76 to invert the frame pulse S14 supplied to the parity calculating circuit 723. As a result, the parity calculating circuit 723 inverts the parity calculation rule to establish frame synchronization in a parity calculation for the signal stream S9. When the frame synchronization decision circuit 725 determines that the parity calculation is in a frame-synchronized state, the EX-OR gate 722 outputs the frame pulse S14 properly indicating the parity rule switching position.

Note that the frame pulse generating circuit 721, the EX-OR gate 722, the parity calculating circuit 723, the parity bit comparator 724, and the frame synchronization decision circuit 725 constitute a code synchronization circuit 172 having a function of generating the frame pulse S14 for establishing frame synchronization in the rate converter 114.

Each signal stream S9 supplied to the decoder 113 and the parity comparison result signal S74 from the code synchronization circuit 172 are supplied to an error-correcting circuit 171. The error-correcting circuit 171 performs error correction of each signal stream S9 by using an error-correcting algorithm based on a total of four bits, i.e., the parity bit and the redundancy code added by the encoder 103, and eliminates the four-bit redundancy code to generate the N signal streams S10.

FIG. 8 shows an example of a 1-to-2 converter 181 incorporated in the rate converter 114 used in this embodiment.

Referring to FIGS. 2, 4A to 4N, and 8, the 1-to-2 converter 181 is constituted by a serial/parallel converter 127 for distributing the 11 signal streams S10 to two output terminals, output 0 and output 1, in accordance with the frame pulse S14 to form the 22 signal streams S11. More specifically, in the serial/parallel converter 127, 11 bits of each of the 11 signal streams S10 which correspond to the first half period of a two-block width are output to output 0, whereas 11 bits which correspond to the second half period of the two-block width are output to output 1. That is, the converter 127 can output the signal streams S11 having the same signal arrangement as that of the signal streams S2 in the transmitting section 1.

As has been described above, according to the present invention, the transmitting section transmits frame pulse (phase) information required for rate conversion of signal streams by switching different coding rules, and the receiving section reproduces the signal streams by detecting the switching of the coding rules. Therefore, no frame pulse needs to be added to an information signal in the transmitting section, and the redundancy of an information signal to be transmitted is not increased.

What is claimed is:

1. A coded modulation apparatus, comprising:

a transmitting unit for performing error-correcting coding of eight first signal streams at a coding rate R=N/M (where N and M are natural numbers, and M is not less than N), for converting the first signal streams into a $2^m$-value quadrature amplitude-modulated radio signal (where m is a natural number not less than four, and M is a multiple of m), and for transmitting the radio signal to a channel; and a receiving unit for receiving the radio signal from said transmitting unit via the channel, and for converting the radio signal into second signal streams, each of the second signal streams having the same signal format as that of each of the first signal streams;

said transmitting unit including:

first rate conversion means for serial/parallel-converting the first signal streams in units of N/4 bits at a one-to-N/4 ratio to generate 2N third signal streams;

second rate conversion means for parallel/serial-converting the third signal streams from said first rate conversion means at a two-to-one ratio to generate N fourth signal streams, and generating a first frame pulse having a frame width equal to an N/4-bit width of one of the first signal streams;

coding means for generating redundancy codes based on the fourth signal streams to provide M redundancy code streams, said coding means generating said codes by performing error-correcting coding of the fourth signal streams according to different predetermined coding rules respectively set for respective first and second half portions of a respective frame on the basis of the first frame pulse from said second rate conversion means;

third rate conversion means for parallel/serial converting the redundancy code streams from said coding means at a M/m-to-one ratio to generate m modulated signal streams;

mapping means for converting the modulated signal streams from said third rate conversion means into m mapping signal streams representing coordinates of signal points corresponding to m-bit signals of the modulated signal streams; and modulation means for generating a radio signal to be transmitted to the channel by performing $2^m$-value QAM in response to the mapping signals from said mapping means, and said receiving unit including:
demodulation means for generating m demodulated signal streams by demodulating the radio signal from said channel;
fourth rate conversion means for converting the demodulated signal streams from said demodulation means at a one-to-M/m ratio to generate M fifth signal streams;
decoding means for generating a second frame pulse on the basis of the fifth signal streams from said fourth rate conversion means, and for providing N decoded signal streams by performing error correction of the fifth signal streams from said fourth rate conversion means according to different coding rules respectively set for first and second half portions of a frame on the basis of the second frame pulse and eliminating the redundancy codes added by said coding means;
fifth rate conversion means for parallel/serial-converting the decoded signal streams from said decoding means at a two-to-one ratio on the basis of the second frame pulse from said decoding means to generate 2N sixth signal streams; and
sixth rate conversion means for parallel/serial-converting the sixth signal streams from said fifth rate conversion means at a ratio of N/4-to-one to generate the second signal streams.

2. An apparatus according to claim 1, wherein said coding means generates a redundancy code stream by performing error-correcting coding according to different parity code rules respectively set for first and second half portions of a frame, and said decoding means comprises code synchronization means for establishing frame synchronization on the basis of a parity calculation for each of the fifth signal streams from said fourth rate conversion means, which have undergone the error-correcting coding according to the different parity code rules respectively set for the first and second half portions of the frame, and a parity comparison result, and error-correcting means for performing error correction of each of the fifth signal streams from said fourth rate conversion means of the basis of the parity comparison result from said code synchronization means.

3. An apparatus according to claim 2, wherein said code synchronization means comprises frame pulse generating means for generating a third frame pulse representing a frame width in response to an apparatus clock, an exclusive-OR gate for calculating an exclusive OR of a frame asynchronization signal and the third frame pulse from said frame pulse generating means to generate the second frame pulse, parity calculating means for performing a parity calculation for each of the fifth signal streams from said fourth conversion means by switching parity rules for first and second half portions of a frame on the basis of the second frame pulse from said exclusive-OR gate, and generating a parity bit as a calculation result, parity bit comparison means for comparing the parity bit of each of the fifth signal streams from said fourth conversion means with the parity bit from said parity calculating means for every period corresponding to ½ of a width of a frame with reference to the second frame pulse from said exclusive-OR gate, and generating a parity comparison result signal representing a comparison result and supplied to said error-correcting means and a parity error signal representing a parity error, and frame synchronization determining means for generating the frame synchronization determination signal representing asynchronism of a parity calculation if the number of parity error signals from said parity bit comparison means is larger than a predetermined threshold value.

4. A transmitting unit used for a coded modulation apparatus and adapted to perform error-correcting coding of eight first signal streams at a coding rate R=N/M (where N and M are natural numbers, and M is not less than N), convert the first signal streams into a $2^m$-value quadrature amplitude-modulated radio signal (m is a natural number not less than four, and M is a multiple of m), and transmit the radio signal to a channel;
said transmitting unit comprising:
first rate conversion means for serial/parallel converting the first signal streams in units of N/4 bits at a one-to-N/4 ratio to generate 2N third signal streams;
second rate conversion means for parallel/serial converting the third signal streams from said first rate conversion means at a two-to-one ratio to generate N fourth signal streams, and generating a first frame pulse for setting a frame width equal to an N/4-bit width of the first signal stream;
coding means for adding a predetermined redundancy code to each of the fourth signal streams from said second rate conversion means, and generating M redundancy code streams by performing error-correcting coding of the fourth signal streams from said second rate conversion means according to different coding rules respectively set for first and second half portions of a frame on the basis of the first frame pulse from said second rate conversion means;
third rate conversion means for parallel/serial converting the redundancy code streams from said coding means at a M/m-to-one ratio to generate m modulated signal streams; mapping means for converting the modulated signal streams from said third rate conversion means into m mapping signal streams representing coordinates of signal points corresponding to m-bit signals of the modulated signal streams; and
modulation means for generating a radio signal to be transmitted to the channel by performing $2^m$-value QAM in response to the mapping signals from said mapping means.

5. A receiving unit used for a coded modulation apparatus and adapted to perform error-correcting decoding of eight first signal streams encoded at a coding rate R=N/M (where N and M are natural numbers, and M is not less than N), and receive a $2^m$-value quadrature amplitude-modulated radio signal (m is a natural number not less than four, and M is a multiple of m) via a channel,
said receiving unit comprising:
demodulation means for generating m demodulated signal streams by demodulating the radio signal from said channel;
first rate conversion means for converting the demodulated signal streams from said demodulation means at a one-to-M/m ratio to generate M second signal streams;
decoding means for generating a first frame pulse on the basis of the second signal streams from said first rate conversion means, and generating N decoded signal streams by performing error correction of the second signal streams from said first rate conversion means according to different coding rules respectively set for first and second half portions of a frame on the basis of the first frame pulse and eliminating the redundancy code added by said coding means;
second rate conversion means for parallel/serial converting the decoded signal streams from said decoding means at a two-to-one ratio on the basis of the first frame pulse from said decoding means to generate 2N third signals streams; and third rate conversion means for parallel/serial converting the third signal streams from said second rate conversion means at a N/4-to-one ratio to generate the fourth signal streams.

6. A unit according to claim 5, wherein said decoding means comprises code synchronization means for establishing frame synchronization on the basis of a parity calculation for each of the second signal streams from said first rate conversion means, which have undergone error-correcting coding according to the different parity code rules respectively set for the first and second half portions of the frame, and a parity comparison result, and error-correcting means for performing error correction of each of the second signal streams from said first rate conversion means on the basis of the parity comparison result from said code synchronization means.

7. A unit according to claim 6, wherein said code synchronization means comprises frame pulse generating means for generating a second frame pulse representing a frame width in response to an apparatus clock, an exclusive-OR gate for calculating an exclusive OR of a frame asynchronization signal and the second frame pulse from said frame pulse generating means to generate the first frame pulse, parity calculating means for performing a parity calculation for each of the second signal streams from said first conversion means by switching parity rules for first and second half portions of a frame on the basis of the first frame pulse from said exclusive-OR gate, and generating a parity bit as a calculation result, parity bit comparison means for comparing the parity bit of each of the second signal streams from said first conversion means with the parity bit from said parity calculating means for every period corresponding to ½ of a width of a frame with reference to the first frame pulse from said exclusive-OR gate, and generating a parity comparison result signal representing a comparison result and supplied to said error-correcting means and a parity error signal representing a parity error, and frame synchronization determining means for generating the frame synchronization determination signal representing asynchronism of a parity calculation if the number of parity error signals from said parity bit comparison means is larger than a predetermined threshold value.

\* \* \* \* \*